Feb. 3, 1959     C. A. RIDINGS ET AL     2,872,009
COIN APPARATUS

Filed April 15, 1955     10 Sheets-Sheet 1

Inventors:
Clements A. Ridings,
Alvin W. Holstein,
Koenig and Pope,
Attorneys.

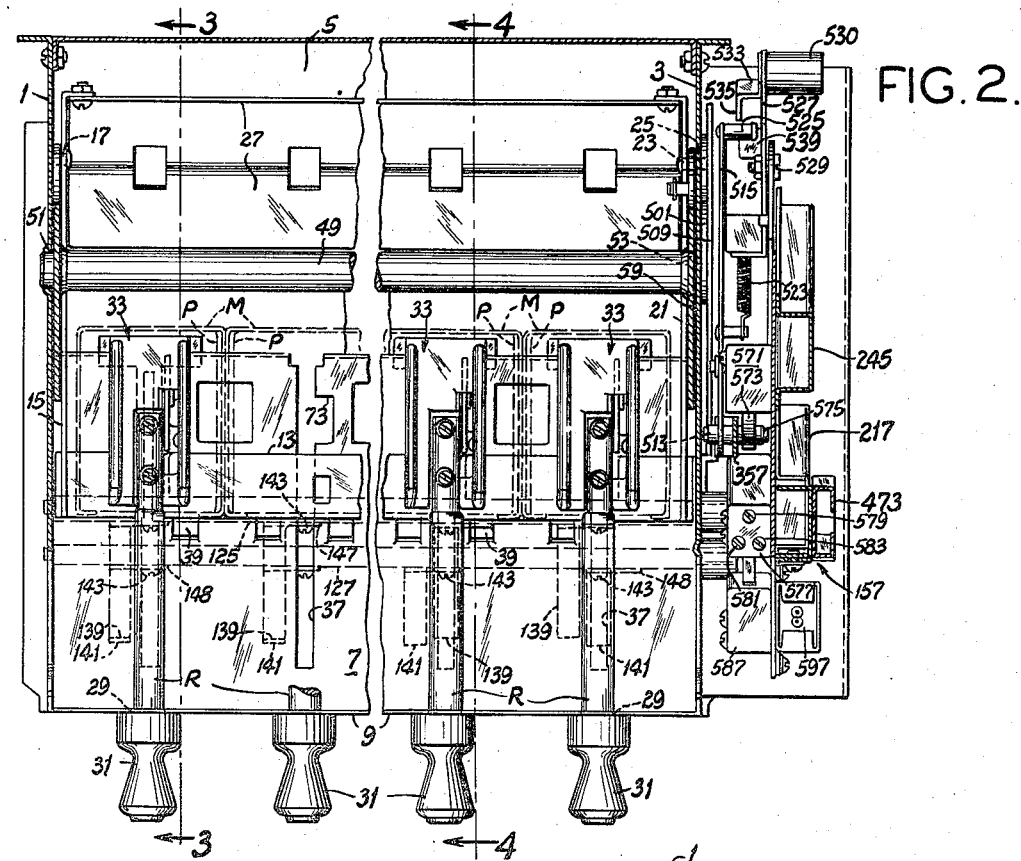

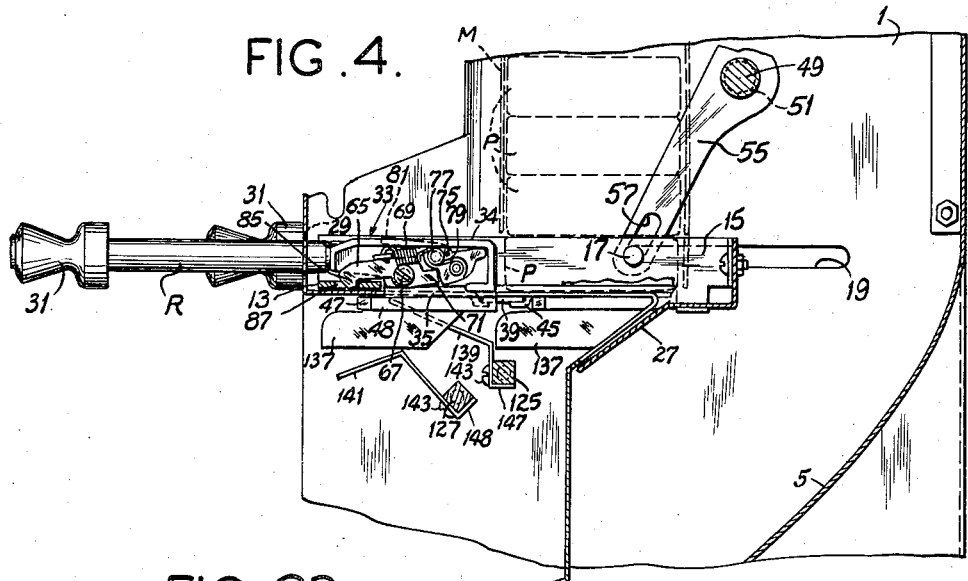

Feb. 3, 1959
C. A. RIDINGS ET AL
2,872,009
COIN APPARATUS
Filed April 15, 1955
10 Sheets—Sheet 4
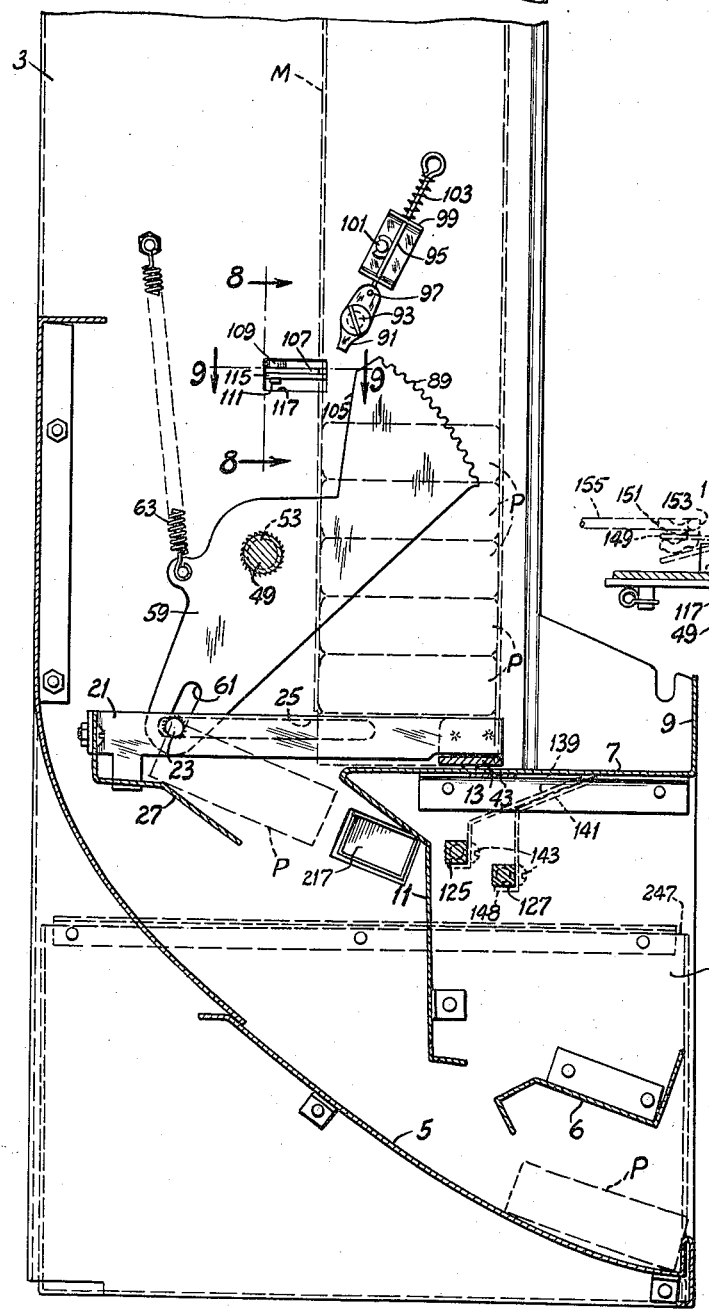
FIG. 7.
FIG. 8.
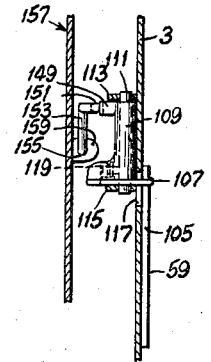
FIG. 9.
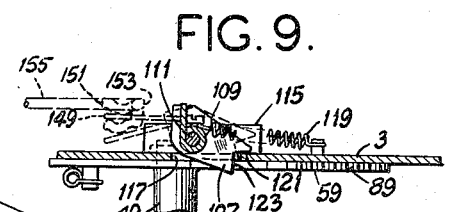

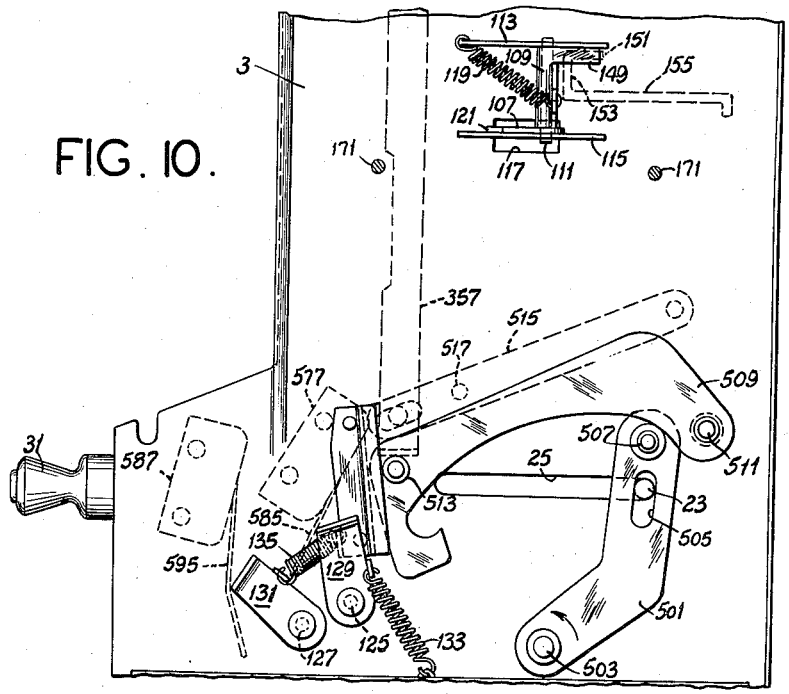
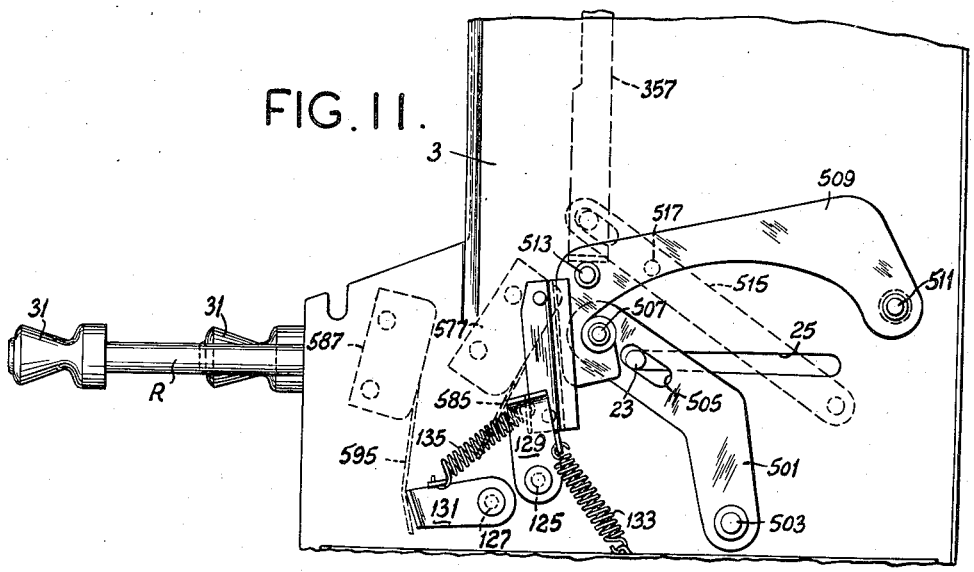

Feb. 3, 1959 C. A. RIDINGS ET AL 2,872,009
COIN APPARATUS
Filed April 15, 1955 10 Sheets-Sheet 6

Feb. 3, 1959  C. A. RIDINGS ET AL  2,872,009
COIN APPARATUS
Filed April 15, 1955  10 Sheets-Sheet 7
FIG. 13.
FIG. 14.
FIG. 15.
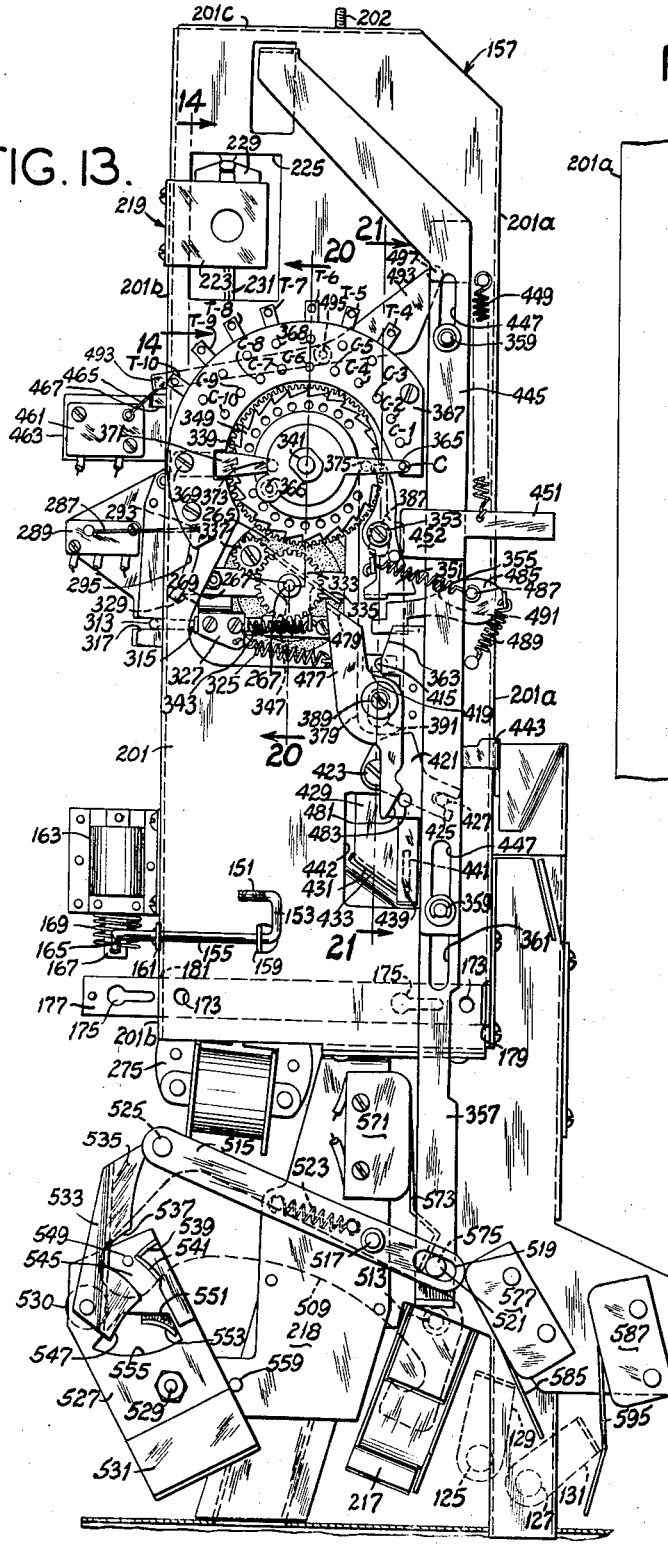
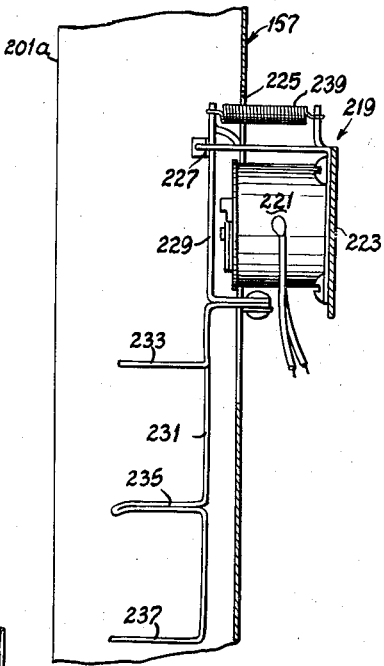
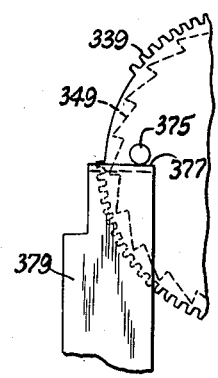
Clemento A. Ridings,
Alvin W. Holstein,
Inventors.
Koenig and Pope,
Attorneys.

Feb. 3, 1959  C. A. RIDINGS ET AL  2,872,009
COIN APPARATUS
Filed April 15, 1955  10 Sheets-Sheet 8
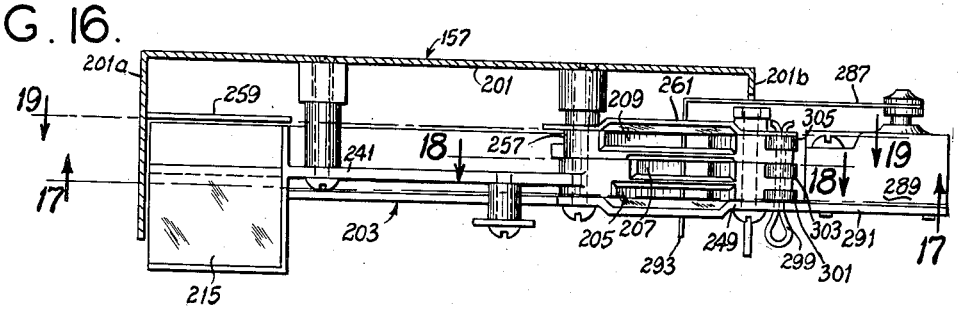
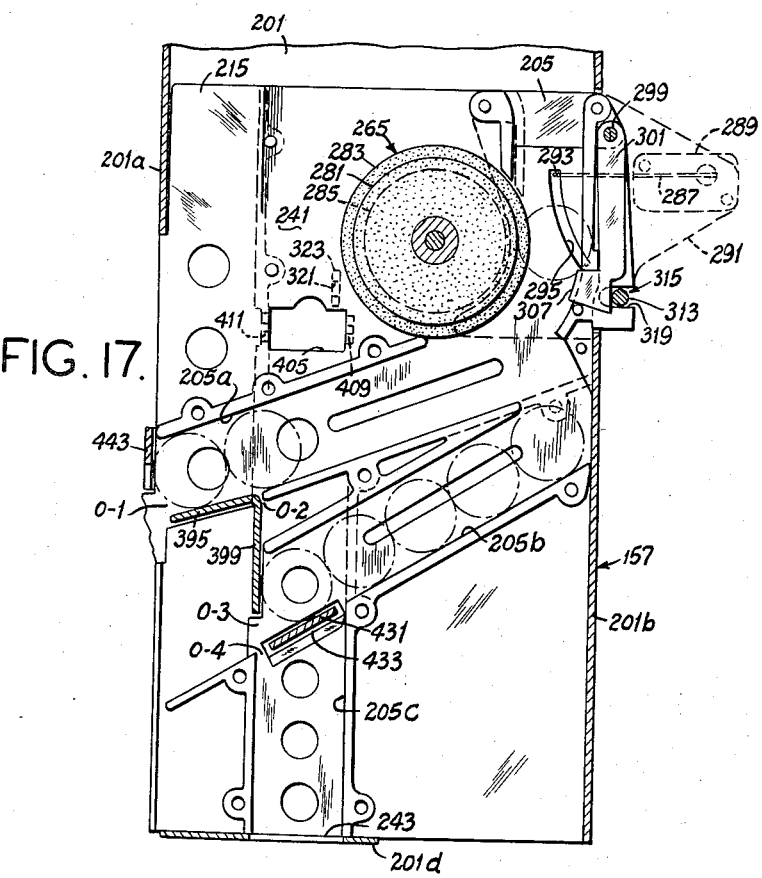

Feb. 3, 1959  C. A. RIDINGS ET AL  2,872,009
COIN APPARATUS
Filed April 15, 1955  10 Sheets-Sheet 9

Clemento A. Ridings,
Alvin W. Holstein,
Inventors.
Koenig and Pope,
Attorneys.

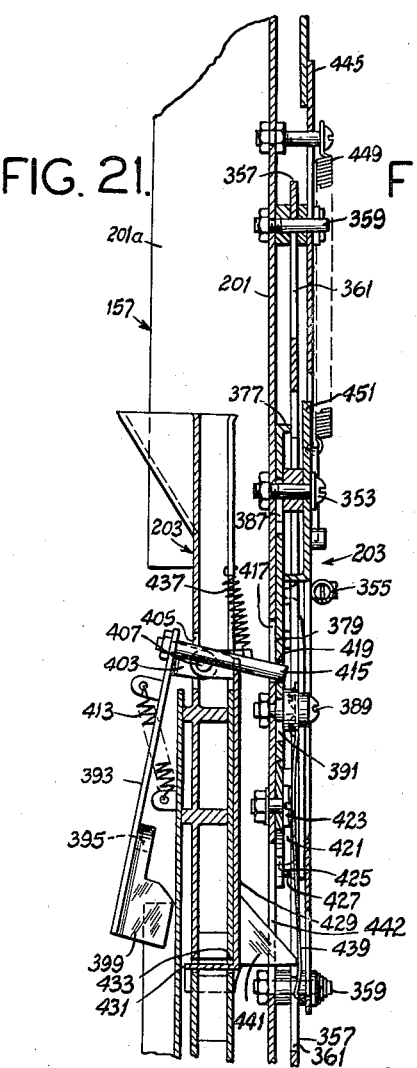

United States Patent Office 2,872,009
Patented Feb. 3, 1959

2,872,009

COIN APPARATUS

Clements A. Ridings, Normandy, and Alvin W. Holstein, Lemay, Mo., assignors, by mesne assignments, to National Vendors, Inc., a corporation of Missouri Application April 15, 1955, Serial No. 501,532

10 Claims. (Cl. 194—10)

This invention relates to coin apparatus, and more particularly to such apparatus for controlling the operation of a vending machine or the like.

Among the several objects of the invention may be noted the provision of an improved coin apparatus for controlling the operation of a vending machine or the like operable to dispense items of three different prices, for example twenty-five cents, thirty cents, and thirty-five cents; the provision of coin apparatus of this class adapted for easy conversion to different three-price set-ups, for example from the above-mentioned set-up to a twenty cent, twenty-five cent, thirty cent set-up; the provision of apparatus of this class which includes manually operated vending mechanism and an electrically operated coin mechanism, the latter being removable as a unit for facilitating servicing; the provision of apparatus of this class which prevents both overpayment and underpayment, as will be made clear; and the provision of apparatus of this class which is reliable in operation. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, Fig. 1 is a front elevation of an apparatus constructed in accordance with this invention, partly broken away;

Fig. 2 is a horizontal section taken on line 2—2 of Fig. 1;

Fig. 3 is a vertical section taken on line 3—3 of Fig. 2;

Fig. 4 is a vertical section taken on line 4—4 of Fig. 2, showing a selector of the apparatus pulled out;

Fig. 5 is an enlarged fragment of Fig. 4, showing parts in a moved position;

Fig. 6 is a section taken on line 6—6 of Fig. 5;

Fig. 7 is a vertical section taken on line 7—7 of Fig. 1;

Fig. 8 is an enlarged vertical section taken on line 8—8 of Fig. 7;

Fig. 9 is a horizontal section taken on line 9—9 of Fig. 8;

Fig. 10 is a vertical section taken on line 10—10 of Fig. 1;

Fig. 11 is a view similar to Fig. 10 showing a moved position of parts;

Fig. 13 is a view taken on line 13—13 of Fig. 1;

Fig. 14 is an enlarged vertical section taken on line 14—14 of Fig. 13;

Fig. 15 is a fragmentary detail;

Fig. 16 is a horizontal section taken on line 16—16 of Fig. 12, parts being omitted;

Figure 12:
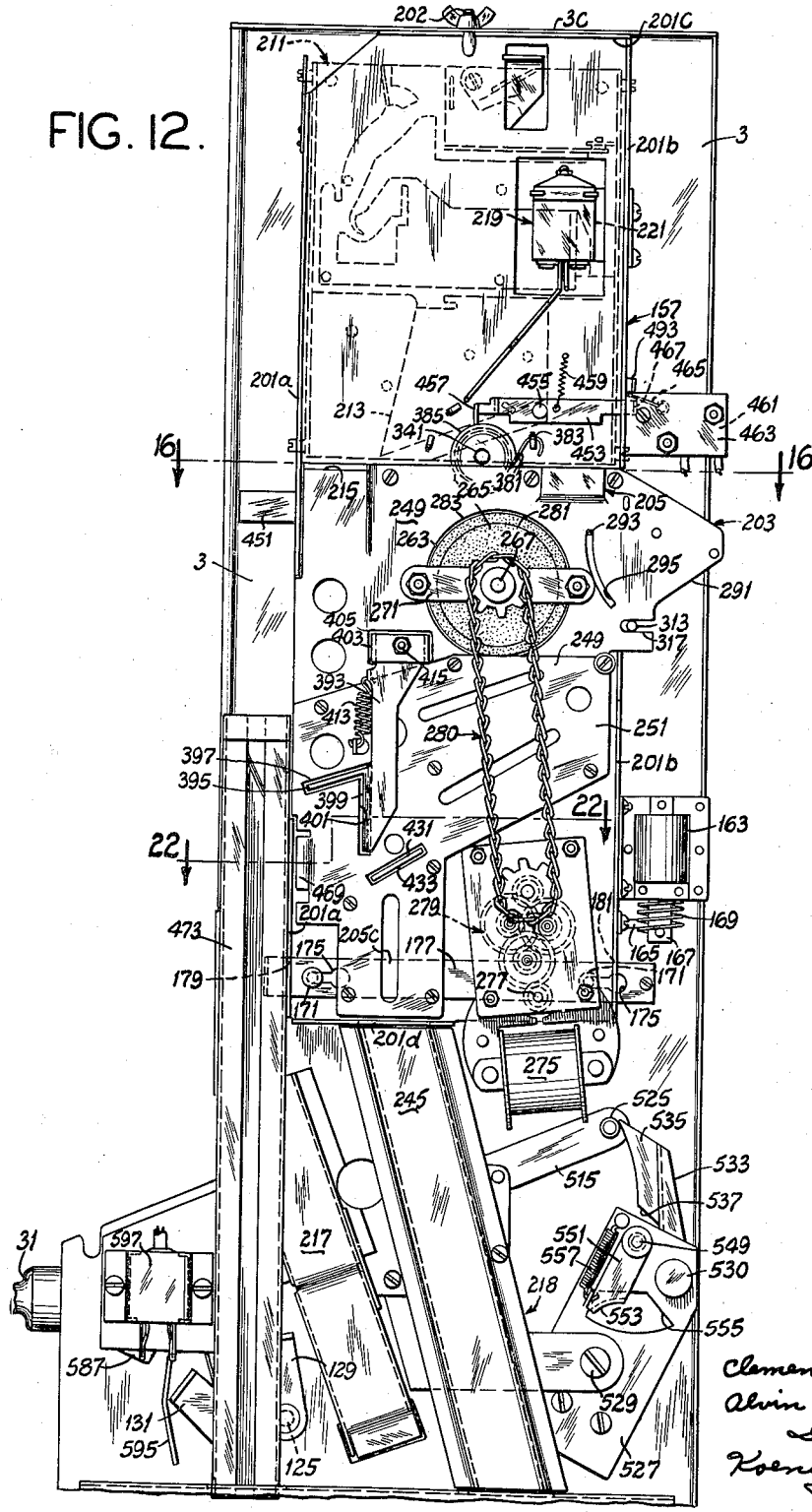
Fig. 12 is a right side elevation of Fig. 1.
Figure 18:
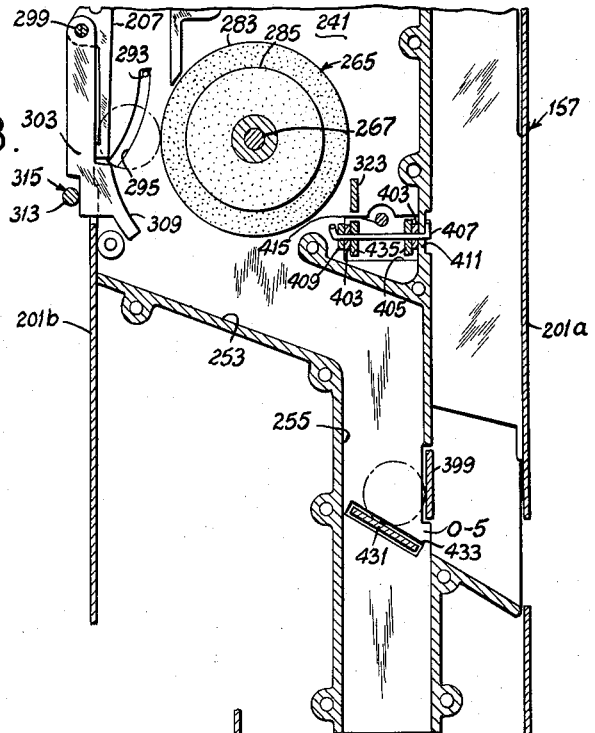
Figure 19:
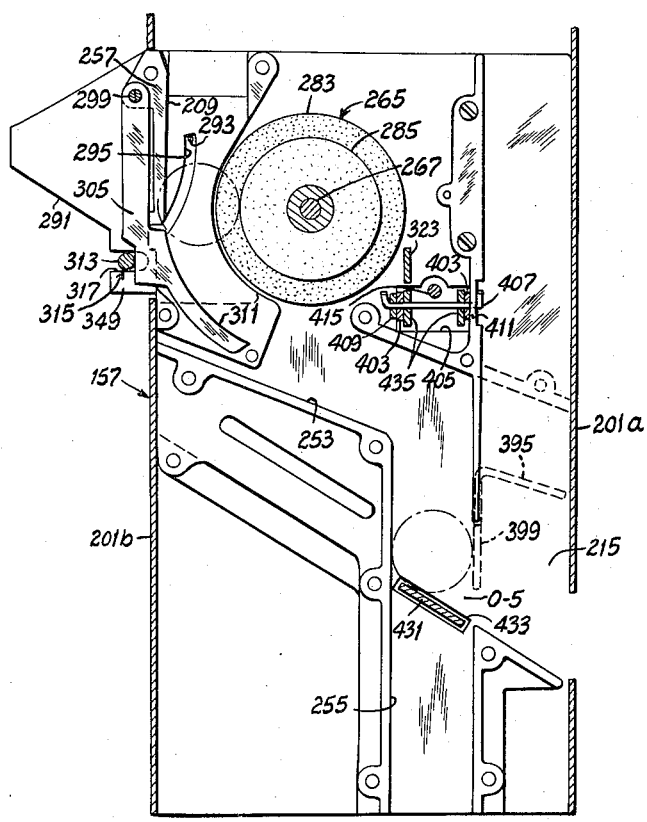

Figs. 17, 18 and 19 are reduced vertical cross sections taken on lines 17—17, 18—18 and 19—19, respectively, of Fig. 16;

Fig. 20 is an enlarged vertical cross section taken on line 20—20 of Fig. 13;

Fig. 21 is an enlarged vertical cross section taken on line 21—21 of Fig. 13;

Fig. 22 is an enlarged cross section taken on line 22—22 of Fig. 12; and,

Fig. 23 is a wiring diagram.

Corresponding reference characters indicate corresponding parts throughout the several views of the drawings.

The invention is herein disclosed as it relates to a cigarette vending machine having a plurality of vertical magazines arranged side-by-side, each for holding a stack of packages of cigarettes. Associated with each magazine is a dispensing device comprising a selector or pull-out rod which must be pulled out from a retracted position and then returned to retracted position to dispense a pack of cigarettes. The coin apparatus of this invention is adapted to allow for utilizing one or more of the magazines for packages of a first price (twenty-five cents, for example), one or more of the magazines for packages of a second price (thirty cents, for example), and one or more of the magazines for packages of a third price (thirty-five cents, for example). It will be understood however, that the invention is not limited to use in conjunction with cigarette vending machines, and may be used in conjunction with a machine for vending other items.

Figure 1:
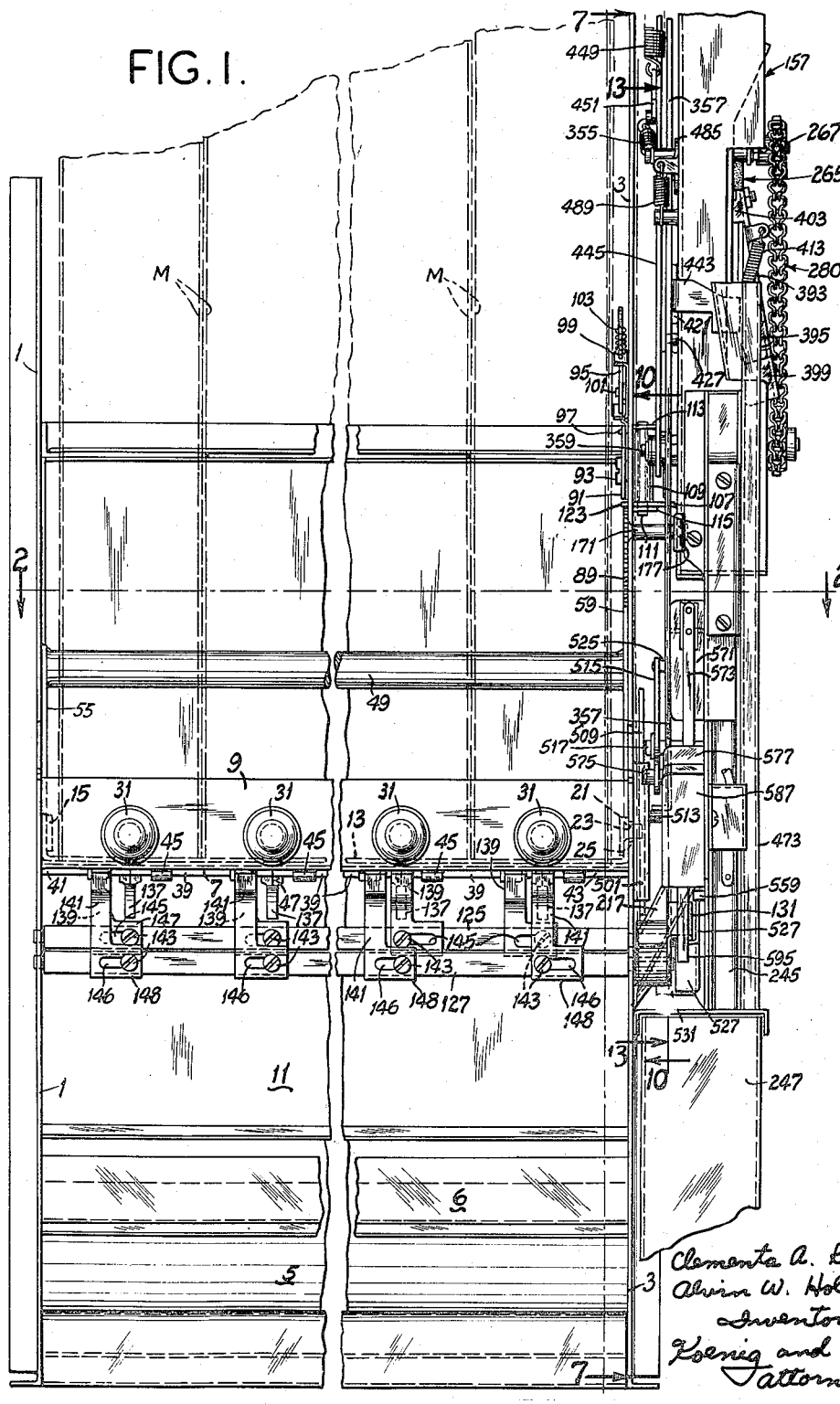

Referring to the drawings, first more particularly to Figs. 1–4 and 7, the invention is herein disclosed as it refers to a cigarette vending machine comprising left and right side walls 1 and 3. As shown in phantom, vertical magazines M for packages P of cigarettes are located in the space between the walls. For each magazine there is a selector or pull-out rod R. Four magazines and four rods R are shown in Figs. 1 and 2, but it will be understood that the apparatus will usually have more than four, and may even have only three (but no less than three). A receiver 5 extends between the walls 1 and 3 at the bottom of the apparatus to receive a package dispensed from any one of the magazines. Extending between the side walls at the front of the apparatus above the receiver is a guard plate 6 and above the latter is a fixed horizontal plate 7. This plate 7 has an upwardly extending front flange 9 and a downwardly extending rear flange 11. On the plate 7 is a draw bar 13 which extends from one side wall to the other. The draw bar is slidable on plate 7 transversely with respect to its own length, and in forward and rearward direction with respect to the apparatus. Extending rearward from the left end of the draw bar 13 (as viewed from the front of the apparatus) is a horizontal arm 15 (see Figs. 3 and 4) having a stud 17 slidable in a horizontal slot 19 in the left side wall 1. Extending rearward from the right end of the draw bar 13 is a horizontal arm 21 (see Fig. 7) having a stud 23 slidable in a horizontal slot 25 in the right side wall 3. Extending between the rear ends of the arms 15 and 21 is an apron 27.

The draw bar 13 is adapted to be moved from the rearward retracted position illustrated in Figs. 2, 3 and 7 toward the front of the apparatus (toward the front flange 9 of plate 7) by pulling out any one of the selector rods R. Each rod R extends through an opening 29 in the flange 9 and has a knob 31 on its outer end. Fixed on the inner end of each rod R is a head 33. Each head has a top flange 34 and a vertical web 35 which extends down through a slot 37 in the plate 7. The forward ends of the webs 35 engage the rearward edge of the bar 13 (see Figs. 3–6). Lock-out means is provided to prevent pulling out more than one rod R at a time. This is shown to comprise a series of interlock tumblers 39 mounted to be slidable laterally of the apparatus under the plate 7 between end stops 41 and 43. The tumblers are guided by ears 45 struck from the plate 7. Each of the heads 33 has a nose 47 at the forward end of a horizontal flange 48 at the bottom of the web 35. Flange 48 is below plate 7. The arrangement is such that when any one rod R is pulled out, the respective nose 47 spreads the entire series of tumblers apart to lock all the other rods R against being pulled out. The construction of the tumblers is similar to that shown in U. S. Patent 2,377,413, and since the details thereof do not form a part of this invention, will not be further described.

A shaft 49 extends between the side walls 1 and 3 in the rear of the magazines M, being journalled at its ends in openings 51 and 53 in the side walls 1 and 3, respectively. Fixed on the shaft on the inside of the left side wall 1 is a lever 55 (Figs. 3 and 4). This lever has a slot 57 receiving the stud 17. Lever 55 is provided for a match book dispensing mechanism, which is not shown since it is not a part of this invention. Fixed on the shaft 49 on the inside of the right side wall is a control lever 59 (Fig. 7). This has a slot 61 receiving the stud 23 on arm 21. A tension spring 63 biases the lever 59 and shaft 49 to turn clockwise as viewed in Fig. 7. This biases the draw bar 13 rearward, thereby normally holding the draw bar and all the rods R in the rearward retracted position illustrated in Figs. 2, 3 and 7 wherein the knobs engage the front flange 9 of plate 7.

When any given rod R is in its retracted position, its head 33 is located under the respective magazine (see Fig. 3). Each magazine is adapted to hold a stack of packages P, with the stack bearing on the respective head 33. Upon pulling out a rod R, the respective head 33 moves out from under the respective stack of packages, and the stack drops down onto the plate 7 (see Fig. 4). On return of the rod R to its retracted position, the bottom package of the dropped stack is pushed rearward off the plate 7, and this package falls off the apron 27 into the receiver 5 (see Fig. 7). Associated with each head 33 is means for preventing pull-out of the respective rod R if the respective magazine M is empty. This means comprises a lever 65 pivoted at 67 on the right side of the head. This lever is biased by a spring 69 toward a locking position (see Fig. 5) in which its rearward end 71 is adapted to engage the forward end of a slot 73 in the plate 7 to lock the rod R against being pulled out. The lever 65 is adapted to be latched in its locking position by a package-controlled latch 75 pivoted at 77 on the right side of the head. Latch 75 is biased by a spring 79 toward a latching position (see Fig. 5) in which it holds the lever 65 in locking position. Latch 75 has a finger 81 which, in the latching position of 75, extends above the head 33 through a slot 83 in the top flange 34 of the head. The stack (one or more packages) in the magazine holds the finger 81 down when the rod R and head 33 are in retracted position, thereby to hold the latch 75 in a retracted position (see Fig. 3), freeing the lever 65 for rocking counterclockwise as viewed in Figs. 3–5 when its rearward end 71 engages the forward end of slot 73.

Assuming that there is at least one package in the magazine so that the latch 75 is held in its retracted position, upon pulling out the rod R the lever 65 is permitted to rock counterclockwise from its locking position shown in Fig. 5 to the retracted position shown in Fig. 4 when its rearward end 71 engages the forward end of slot 73. The lever 65 has a downwardly projecting nose 85 at its forward end which then enters an opening 87 in the draw bar 13. When the head moves out from under the stack of packages, the latch 75 is held in its retracted position by the lever 65 (see Fig. 4). If the magazine is empty, the latch 75 occupies its latching position (Fig. 5) when the head 33 is in retracted position. If an attempt is then made to pull out the rod R, lever 65 is latched in its locking position and the rearward end 71 of lever 65 engages the forward end of slot 73 to prevent the rod from being pulled out.

When all the rods R are in retracted position, and when the draw bar 13 hence is in its rearward retracted position, the lever 59 occupies the retracted position illustrated in Fig. 7. The upper end of the lever 59 is formed with ratchet teeth as indicated at 89. At 91 is shown a latching pawl for the lever pivoted on the inside of wall 3 by means of a stud 93. The pawl is normally held in the position shown in Fig. 7 by an overcentering spring mechanism including a rod 95 pivotally connected to the pawl at 97. The rod is slidable in a U-shaped bracket 99 pivoted on the inside of the wall 3 by a stud 101. A spring 103 biases the rod to move outward away from the pawl. The toothed end 89 of the lever comes into engagement with the pawl when the lever is swung counterclockwise from its retracted position as viewed in Fig. 7. This precludes return movement of the lever, unless the lever swings far enough for its toothed end 89 to move rearward clear of the pawl 91. This compels full-stroke operation of any rod R once it has been pulled out far enough for engagement of the teeth with the pawl. However, any rod R may be pulled out a short distance before the pawl engages the teeth.

The lever 59 has a shoulder 105 adapted, upon counterclockwise movement of the lever through a small angle from its retracted position illustrated in Fig. 7, for engagement with a coin-controlled tumbler or stop 107 (see particularly Figs. 7–10). This stop comprises a horizontal plate fixed on the lower end of a sleeve 109 rotary on a vertical rod 111 mounted in upper and lower members 113 and 115 fixed on the outside of wall 3. The stop 107 is biased toward an operative position projecting through an opening 117 in the wall 3 by a spring 119, this bias being clockwise as viewed in Fig. 9. Clockwise movement of the stop under the bias of spring 119 is limited by the engagement of a shoulder 121 on the stop with the bounding edge of the wall 3 at the forward side of the opening 117 (see Fig. 9). This determines the operative position of the stop, in which position another shoulder 123 thereon is positioned on the inside of the wall 3 for engagement by the shoulder 105 on the lever 59. The arrangement is such that, with the stop 107 in its operative position projecting through opening 117 as illustrated in Fig. 9, all the selector rods R are locked against being pulled out any more than a small distance corresponding to the small angle through which lever 59 may turn before its shoulder 105 engages the shoulder 123 of the stop. This small movement of the lever is not sufficient for the toothed end 89 of the lever to latch onto the pawl 91. In order that any rod may be completely pulled out for full-stroke operation, it is necessary that the stop 107 be retracted by counterclockwise movement from the position shown in Fig. 9 to position it outside of side wall 3 and out of the path of the lever 59.

Two rock shafts 125 and 127 are journalled at their ends in the side walls 1 and 3 below the plate 7 (see Figs. 1–4, 7, 10 and 11). Shaft 127 is located in front of and somewhat below shaft 125. These shafts are hereinafter referred to as the front and rear price shafts. On the right end of the rear price shaft 125 outside of wall 3 is a switch-operating arm 129. On the right end of the front price shaft 127 outside of wall 3 is a switch-operating arm 131. The price shafts 125 and 127 are biased to rock clockwise as viewed in Figs. 10 and 11 by springs 133 and 135, respectively. The rear price shaft 125 is adapted to be rocked counterclockwise as viewed in Fig. 10 when any rod R for dispensing an item of the second price (thirty cents, for example) is pulled out. The front price shaft 127 is adapted to be rocked counterclockwise as viewed in Fig. 10 when any rod R for dispensing an item of the third price (thirty-five cents, for example) is pulled out. Each of the heads 33 has a lower vertical rib 137. As to any rod or rods R for items of the second price, the rib 137 on the head 33 of any one of these rods is engageable with an arm 139 on the shaft 125 when the rod is pulled out, thereby to rock the shaft 125 counterclockwise against the bias of spring 133. As to any rod or rods R for items of the third price, the rib 137 on the head 33 of any one of these rods is engageable with an arm 141 on the shaft 127 when the rod is pulled out to rock the shaft 127 counterclockwise against the bias of spring 135.

For convenience, an arm 139 is provided on shaft 125 for every one of the rods R, and an arm 141 is provided on shaft 127 for every one of the rods R. As to those rods for dispensing items of the first price (twenty-five cents, for example), the arms 139 and 141 are positioned to lie out of the path of the respective ribs 137. Thus, neither shaft 125 nor shaft 127 is rocked when a rod for an item of the first price is pulled out. As to those rods for dispensing items of the second price, the arms 139 are positioned to lie in the path and the arms 141 are positioned to lie out of the path of the respective ribs 137. As to those rods for dispensing items of the third price, the arms 141 are positioned to lie in the path and the arms 139 out of the path of the respective ribs 137. This makes it possible to utilize any of the rods R for either first, second or third price items, as desired.

The arms 139 and 141 are attached to the shafts 125 and 127 by set screws 143 threaded in tapped holes in the shaft and extending through elongate slots 145, 146 in base portions 147, 148 of the respective arms, allowing the arms to be shifted on the shafts either into or out of position for engagement by ribs 137. Fig. 1 shows the first two rods at the left for items of the first price, the third rod from the left for an item of the second price, and the rod at the right for an item of the third price. The arms 139 and 141, shafts 125 and 127 and arms 129 and 131 normally occupy the retracted position shown in Figs. 3, 7 and 10 determined by engagement of the ends of the arms 139 and 141 with the bottom of plate 7.

At the upper end of the sleeve 109 is an integral rearwardly extending finger 149. This is adapted for engagement by a finger 151 at the end of a radial arm 153 on a rock shaft 155 to retract the stop 107. Shaft 155 is mounted on a coin unit designated in its entirety by the reference character 157. Unit 157 is removably mounted on the outside of side wall 3. Shaft 155 is mounted in brackets 159 and 161 on unit 157. A solenoid 163 is mounted on unit 157. A radial arm 165 connects the plunger 167 of the solenoid and the shaft 155. A spring 169 biases the plunger 167 downward to bias the finger 151 to a retracted position. Upon energizing the solenoid 163, the plunger 167 moves upward and rocks the shaft 155 to move the finger 151 toward finger 149, thereby rocking the latter to retract the stop 107. Finger 151, arm 153, shaft 155 and arm 165 are shown as formed in one piece from a rod.

The coin unit 157 (see Figs. 1, 2 and 12-22) is adapted to accept nickels, dimes and quarters. It has a main plate 201 for supporting its various elements. This plate has vertical front and rear flanges 201a and 201b, and a top flange 201c. It is removably mounted on the outside of side wall 3 with these flanges extending outward. The side of the plate from which the flanges extend outward is hence referred to as the outside of the plate, and its other side is referred to as its inside. A mounting screw is shown at 202 in the top flange 201c for making a connection with a top flange 3c on wall 3. Studs 171 extend outward from the wall 3 through holes 173 in the plate 201 and through keyhole slots 175 in a slidable locking bar 177. This bar is slidable in openings at 179 and 181 in the flanges 201a and 201b. In its position shown in Fig. 12 it locks the coin unit to the studs 171. By sliding the bar forward to align the large ends of the keyhole slots with the holes 173, the coin unit may be removed from the studs. Mounted between the flanges 201a and 201b on the outside of the plate, and spaced outward from the outside of the plate, is an upper multiple coin chute assembly 203. This has three upper rear vertical coin chutes 205, 207 and 209 side-by-side. The planes of these chutes are parallel to the plate 201.

The outermost chute 205 is for nickels, the next chute 207 for dimes, and the inner chute 209 for quarters.

A coin selector 211 of known type, such as disclosed in U. S. Patent 2,292,628, is mounted between the flanges 201a and 201b on the outside of the plate 201 above the multiple coin chute assembly 203, with its coin outlets above the upper ends of the three coin chutes. Details of the coin selector are indicated in phantom in Fig. 12. It will be understood that coins deposited in the vending machine in which the coin mechanism is used enter the coin selector, which functions to feed nickels into the nickel chute 205, dimes into the dime chute 207, quarters into the quarter chute 209. The coin selector also functions to eject any slugs through a slug outlet 213, so that they are not fed into the coin chutes. Slugs ejected through the slug outlet 213 drop through a vertical chute 215 in assembly 203 and into a coin return chute 217 which constitutes part of a lower coin chute assembly 218. Any pennies which may be deposited are similarly ejected by the coin selector.

Coins travelling through the coin selector are subject to interception by an off-current coin deflector generally designated 219. This comprises an electromagnetic coil 221 mounted on a bracket 223 fastened to the plate 201 on the inside. The coil reaches through an opening 225 in the plate 201 to the outside. Pivoted on the bracket at 227 is an armature 229 to which is fastened an arm 231 having coin-deflecting fingers 233, 235 and 237. A spring 239 biases the armature and arm to hold the fingers in coin-deflecting position (see Fig. 14) when the coil is deenergized. Under these circumstances, any coin deposited in the machine is returned. As long as the coil is energized, the fingers are held out of coin-deflecting position.

The coin chute assembly 203 comprises a main casting 241 having ribs on its outside face which define the upper nickel chute 205 and a pair of lower nickel chutes 205a and 205b which slope forward and downward from the lower end of chute 205 (see Fig. 17). Chute 205a is open at its forward end as indicated at O-1 and also has a bottom coin outlet at O-2 at its forward end. Chute 205b (which is below 205a) is open at its forward end as indicated at O-3 and has a bottom coin outlet O-4 at its forward end. Below outlet O-4, ribs on the outside face of casting 241 define a vertical nickel outlet chute 205c. Nickels are adapted to drop out of chute 205c through an opening 243 in a bottom flange 201d on plate 201, into a chute 245 of the lower chute assembly 218, and thence into a coin box 247 (see Fig. 1). Upper and lower cover plates for the outside of the main casting are indicated at 249 and 251 (see Fig. 12). These provide outside walls for the stated nickel chutes.

The main casting 241 has ribs on its inside face which define the upper dime chute 207, a chute 253 for both dimes and quarters which slopes forward and downward from the lower end of chute 207 (see Figs. 18 and 19), and a vertical chute 255 leading downward from the forward end of chute 253. Chute 253 is located directly in the back of chute 205a and chute 255 is located directly in back of chute 205c. Dimes and quarters are adapted to drop out of chute 255 through the opening 243 into chute 245. The main casting 241 also has ribs on its inside face which define the previously mentioned chute 215. Secured to the upper part of the main casting 241 on the inside thereof is a casting 257 having ribs which define the upper quarter chute 209 (see Figs. 16 and 19). A quarter exiting from chute 209 enters chute 253. A cover plate for the inside of the main casting is indicated at 259, and a cover plate for the casting 257 is indicated at 261. The chute 255 has a forward outlet O-5 inward of outlet O-3.

The coin chute assembly 203 has an opening 263 in which is located a coin-driving means in the form of a stepped resilient coin-driving roller or wheel 265 for driving nickels, dimes and quarters downward in the respective chutes 205, 207 and 209. This wheel is fixed on a horizontal shaft 267 journalled in members 269 and 271. An electric motor 275 having a shaft 277 is mounted on the outside of main plate 201. Shaft 277 drives the wheel 265 via a speed-reducing gear train generally designated 279, and a chain and sprocket drive 280. The wheel is driven clockwise as viewed in Fig. 12.

The coin-driving wheel 265 is formed of rubber or like suitable resilient material with three side-by-side steps 281, 283 and 285 on three different diameters. The step 281, hereinafter referred to as the nickel step, is located in the plane of the nickel chute 205 and is adapted to engage a nickel and drive it downward in the chute 205. The step 283, hereinafter referred to as the dime step, is located in the plane of the dime chute 207 and is adapted to engage a dime and drive it downward in the chute 207. The step 285, hereinafter referred to as the quarter step, is located in the plane of the quarter chute 209 and is adapted to engage a quarter and drive it downward in the chute 209.

A nickel, dime or quarter entering the respective chute 205, 207 or 209 actuates an operating lever 287 of a motor control switch 289 mounted on an extension 291 of cover plate 249. The lever 287 extends from the switch into the space between the main plate 201 and the assembly 203 and has a finger 293 at its free end which extends into an arcuate slot 295 in the assembly 203. The finger extends completely across all three chutes 205, 207 and 209. The lever 287 is adapted to close the contacts of switch 289 when swung downward from its generally horizontal retracted circuit-breaking position shown in Figs. 13 and 17 by a nickel, dime or quarter dropping downward in the respective chute 205, 207 or 209. Lever 287 is normally biased to its retracted position (which is determined by engagement of finger 293 with the upper end of slot 295) by spring means incorporated in the switch. The bias of the switch spring means is light enough to be readily overcome by the weight of a dime (the lightest coin) bearing on the finger 293. The switch and the pivotal axis of the lever are so located that the lever may swing downward to a circuit-making position wherein the finger 293 is at the lower end of the slot 295, and occupies a retracted chute-clearing position allowing a coin to travel on by the finger. The arrangement is such that whenever a coin, whether a nickel, dime or quarter, is inserted in the machine, the lever is swung down to close switch 289, thereby energizing the motor to drive the coin-driving wheel.

At 299 is shown a cotter pin which extends through the assembly 203 and constitutes a pivot for a nickel arm 301 located in the nickel chute 205 (see Fig. 17), a dime arm 303 located in the dime chute 207 (see Fig. 18), and a quarter arm 305 located in the quarter chute 209 (see Fig. 19). The arms hang down from the pin 299 and have fingers 307, 309 and 311, respectively, at their lower ends. The fingers are of different lengths along the length of the respective chutes, corresponding to the different coin values, and have curved inside edges facing the respective steps of the coin-driving wheel 265, for engagement by coins being driven by the wheel. A nickel being driven by the wheel engages the nickel finger 307 and swings the nickel arm 301 away from the wheel for the length of time that the nickel remains in engagement with the finger 307. A dime being driven by the wheel engages the dime finger 309 and swings the dime arm 303 away from the wheel approximately twice as long. A quarter being driven by the wheel engages the quarter finger 311 and swings the quarter arm 305 away from the wheel approximately five times as long.

The lower ends of the arms 301, 303 and 305 are engageable with a finger 313 at the end of a shift rod 315 in such manner that when any one of the three arms is swung outward by a coin, rod 315 is moved rearward (to the left as viewed in Figs. 13, 18 and 19, to the right as viewed in Fig. 17). The rod 315 is movable in the space between assembly 203 and plate 201, being guided for horizontal reciprocation by sliding reception of finger 313 in aligned slots 317 and 319 in cover plates 249 and 261, and by sliding reception of its other end in a hole 321 in an ear 323 formed on the main casting 241. The rod is biased in forward direction to a retracted position by a spring 325. Fixed on the rod is a latch member 327 having a nose 329 adapted to engage over the switch lever finger 293 when the latter is moved to the lower end of the arcuate slot 295 by a coin, and to hold the lever 287 down in circuit-making position as long as rod 315 is held in outward position by one of the arms 301, 303 or 305.

Fixed on the inner end of the shaft 267 is a spur gear 333 (see Figs. 13 and 20). A rocker arm 335 is pivoted on the shaft 267 between gear 333 and the wheel 265. A pinion 37 is mounted on the rocker arm 335 in mesh with the gear 333. Pinion 337 is shiftable into and out of mesh with a gear 339 by rocking the arm 335, while remaining in mesh with gear 333. Gear 339 is fixed on a shaft 341 journalled in the main plate 201 above shaft 267. Arm 335 is biased to swing toward gear 339 by a spring 343 connected between the latch member 327 on rod 315 and the arm 335. Rod 315 has fixed thereon a plate 345 carrying a stud 347 engageable with the arm 335 to hold pinion 337 out of mesh with gear 339 when the rod 315 is retracted. When the rod 315 is shifted rearward by one of arms 301, 303 or 305 (to the left as viewed in Fig. 13), the arm 335 is released for being swung by spring 343 to shift the pinion 337 into mesh with gear 339.

A ratchet 349 is fixed on shaft 341 on the outside of gear 339 to be rotary with the gear 339. A holding pawl 351 for the ratchet is pivoted on a stud 353 secured to the main plate 201 on the inside (see Fig. 13). The pawl is biased toward engagement with the ratchet by a pawl spring 355. At 357 is shown a vertically shiftable reset bar. This bar is guided by upper and lower studs 359 secured to the main plate 201 and received in elongate upper and lower vertical slots 361 in the bar. The bar has a lower retracted position determined by the engagement of the upper ends of the slots with the studs. It carries a cam plate 363 engageable with the pawl 351 upon upward movement of the bar from its retracted position to swing the pawl out of engagement with the ratchet.

The shaft 341, gear 339 and ratchet 349 are parts of a rotary selector switch which further comprises a contact blade 365 mounted on the end of shaft 341 outward of the ratchet 349, being pinned to the ratchet as indicated at 366. At the free end of the blade 365 is a contact C successively engageable, upon rotation of the gear 339 and ratchet 349 in counterclockwise direction as viewed in Fig. 13, with a series of contacts C–1 to C–10 arranged in an arc centered on the axis of shaft 341 on an insulation ring segment plate 367. Contacts C–1 to C–10 are angularly spaced at equal intervals corresponding to the tooth intervals of the ratchet. Plate 367 is mounted on the inside of main plate 201. Terminals T–4 to T–10 lead radially outward from contacts C–4 to C–10 on the inside of plate 367, being fastened thereto by rivets 368 in addition to being fastened by contacts C–4 to C–10. Contacts C–1 to C–10 are hereinafter referred to as price contacts, representing prices ranging from 5¢ to 50¢ in five-cent increments. Terminals are omitted for contacts C–1 to C–3 as herein illustrated, since the coin mechanism is used in a machine stocking items ranging in price upward from 20¢. A main terminal on the insulation plate 367 is indicated at 369. A conductive spring blade 371 is fixed at one end to this terminal and has a contact 373 at its other end wiping the blade 365.

The contact blade 365 normally occupies the retracted zero position shown in Fig. 13 in which it extends generally horizontally to the right, with contact C thereon below the first contact C–1 a distance corresponding to one ratchet tooth interval. This zero position of the blade is determined by engagement of a stud 375 on the back of gear 339 with a finger 377 at the upper end of a vertically shiftable stop bar 379 (see Fig. 15). The gear 339, ratchet and blade are biased toward the zero position by a coil return spring 381 (see Figs. 12 and 20) having one end secured to the plate 201 at 383 and its other end secured to a cam 385 on the inner end of shaft 341. Stop bar 379 is guided for vertical movement by the stud 353 for pawl 351, the stud being received in an elongate slot 387 in the upper end of the bar, and by a lower stud 389 received in an elongate slot 391 at the lower end of the bar. Bar 379 is biased to a lower retracted position, determined by engagement of the upper ends of slots 387 and 391 with studs 353 and 389, by the force of the return spring 381 acting through shaft 341, gear 339 and the stud 375. When the gear 339 rotates counterclockwise from the position shown in Fig. 13, stud 375 moves away from finger 377 to free bar 379 for upward movement.

At 393 is indicated a coin gate which is pivoted at its upper end for swinging movement on a horizontal axis parallel to the planes of the coin chutes (see Figs. 12 and 21). The gate extends down on the outside of assembly 203 from its pivot, and toward its lower end has a narrow finger 395 adapted to enter a slot 397 in cover plate 251 for blocking the nickel outlet O–2. The gate also has a wide finger 399 adapted to enter a slot 401 in assembly 203 for blocking the outlets O–3 and O–5. The gate has inwardly extending hinge ears 403 at its upper end which reach from the outside of the main casting 241 to the inside through an opening 405. Ears 403 receive a hinge pin 407 which is received at one end in a hinge eye 409 formed on the inside of the main casting 241 and at its other end in an opening 411 in a rib on the inside of the main casing. The gate is biased to swing toward the assembly 203 by a spring 413. It is maintained in a retracted position, wherein finger 395 is clear of outlet O–2 and finger 399 is clear of outlets O–3 and O–5, by means of a pin 415 which extends from the upper end of the gate through opening 405 and through an opening 417 in main plate 201 into an opening 419 in the stop bar 379. The arrangement is such that bar 379, when in its lower retracted position, acts through the pin 415 to hold the gate in the swung-out retracted position shown in Fig. 21. When bar 379 moves upward, the gate swings closed so that finger 395 blocks outlet O–2 and finger 399 blocks outlets O–3 and O–5. At 421 is shown a cam for holding the stop bar 379 in raised position in response to lifting of the reset bar 357. The cam 421 is pivoted at 423 on plate 201, and has a slot at 425 receiving a pin 427 on the reset bar 357.

At 429 (see Fig. 21) is indicated a coin rest which is pivoted at its upper end on the hinge pin 407 and which extends down on the inside of assembly 203. At its lower end, the coin rest 429 has a wide finger 431 adapted to enter a slot 433 in assembly 203 for blocking the outlet O–4 and also for blocking the chute 255. The coin rest has hinge ears 435 at its upper end receiving the hinge pin 407. The coin rest is biased by a spring 437 to swing away from assembly 203 to a retracted position wherein finger 431 is clear of outlet O–4 and chute 255. It is shown in this position in solid lines in Fig. 22. It is normally held against the spring bias in an operative position wherein finger 431 blocks outlet O–4 and chute 255 by engagement of a spring finger 439 carried by the reset bar 357 with a cam 441 on the coin rest when the reset bar is down. The cam extends through an opening 442 in main plate 201. When the reset bar is raised, the coin rest is freed to be moved outward to retracted position by the spring 437. The reset bar carries a finger 443 for blocking outlet O–1 when the reset bar is retracted (down). When the reset bar is raised, finger 443 is moved upward clear of O–1.

At 445 is shown a vertically shiftable coin return bar. This is located directly over the reset bar 357, being guided by the studs 359, which are received in elongate upper and lower slots 447 in the return bar. The return bar is biased upward by a spring 449 to a retracted position determined by the engagement of the lower ends of slots 447 with the studs 359. It has an operating arm 451, the inner end 452 of which is engageable with the holding pawl 351 on downward movement of the return bar to release the pawl from the ratchet 349 to allow the return spring 381 to drive the ratchet back to its zero position. Upon such release of the pawl and return of the ratchet, the stop bar 379 is driven downward to open the gate 393.

The cam 385 on the inner end of the shaft 341 is part of an overinsertion mechanism for returning to a customer any inserted coins which raise the total amount inserted to more than the highest priced item stocked in the vending machine with which the coin mechanism is used. This overinsertion mechanism comprises a cam follower lever 453 (see Fig. 12) pivoted at 455 on the main plate 201 and biased for engagement of its inner end 457 with the cam by a spring 459. At 461 is shown an oversertion control switch. This is mounted on a bracket 463 carried by the plate 201. It has a control arm 465 engageable by a finger 467 at the end of the lever 453. The arrangement is such that when the gear 339 and ratchet 349 rotate to move blade 365 past that price contact representing the highest price, the cam actuates the lever to open the switch 461. The switch 461 is connected in series with the off-current coin deflector coil 221, so that, when switch 461 is opened, the coil is deenergized, fingers 233, 235 and 237 are moved to coin-deflecting position, and any coin deposited in the vending machine will be returned.

Assuming that the coin rest 429 is in its operative position wherein finger 431 blocks the outlet O–4 and chute 255 (see Fig. 21 and the dot-dash line position shown in Fig. 22 for finger 431), and that the reset bar 357 is down so that finger 443 blocks outlet O–1, when the coin gate 393 is swung open, thereby unblocking the outlets O–2, O–3 and O–5, any nickels that may be in the chute 205a will drop out through the outlet O–2 and down into the lower end of chute 215. Thence, the nickels will pass into the coin return chute 217 for return to the customer. Any nickels that may be in the coin chute 205b will roll out into the lower end of the coin chute 215 through the outlet O–3, and be guided by a lip 469 (see Figs. 12 and 22) on cover plate 251 into the coin return chute 217 for return to the customer. Entry to the coin return chute 217 is through an opening 471 in the flange 201a of the main plate 201 (see Fig. 22). Any dimes or quarters in chute 255 will roll off finger 431 and through the outlet O–5 into the lower end of chute 215 and thence into the coin return chute 217.

Assuming that the coin gate 393 is closed, upon opening the coin rest 429 thereby to swing the finger 431 out of the slot 433, and upon raising of the reset bar 357, thereby moving the finger 443 clear of the outlet O–1, any nickels in chute 205b will drop through chute 205c and into chute 245. Any dimes or quarters in chute 255 will drop out into chute 245. Any nickels in chute 205a will roll off finger 395 and fall into a chute 473 for delivery to the coin box.

At 477 (see Fig. 13) is indicated a latch adapted to lock the pinion 337 against swinging into engagement with the gear 333 when the reset bar 357 moves upward from its lower retracted position. The latch 477 is pivoted on the stud 389. It has a finger 479 at its upper end adapted to engage under a part of arm 335 on the right of shaft 267 as viewed in Fig. 13. It also has a cam edge portion 481 at its lower end engaged by a stud 483 on cam plate 363 upon upward movement of the reset bar. The holds latch 477 in a position wherein finger 497 holds arm 335 against rocking clockwise as viewed in Fig. 13. At 485 (see Fig. 13) is indicated a latch for holding the pawl 351 out of engagement with the ratchet 349 until the reset bar 357 has substantially completed its return to its retracted position after having moved upward to release the pawl. Latch 485 is pivoted at 487 and biased toward engagement with the pawl 351 by a spring 489. It is held down out of engagement with the pawl by a stud 491 on the reset bar 357. When the reset bar moves upward, the stud 491 is moved upward clear of the latch 485 so that the latter may move under the bias of spring 489 into latching engagement with the released pawl 351 for holding it out of engagement with the ratchet 349. When the bar 357 moves down, toward the end of its downward movement the stud 491 engages the latch 485 and moves it out of engagement with the pawl. At 493 (see Fig. 13) is indicated a lever for opening the switch 461 upon upward movement of the reset bar 357. The lever is pivoted at 495 and has a stud 497 engageable by the upper end of the reset bar.

Mechanism for raising the reset bar 357 is shown to comprise an arm 501 (see Figs. 10 and 11), pivoted at its lower end as indicated at 503 on the side wall 3 and having a slot 505 receiving the stud 23. When the draw bar 13 is in its retracted position, and stud 23 is at the rearward end of the slot 25, arm 501 occupies the retracted position shown in Fig. 10. At its upper end, arm 501 has a roller 507 engaging a cam 509 pivoted at its rearward end as indicated at 511 on side wall 3. At its forward end, the cam 509 has a roller 513 engaging the lower end of the reset bar. When any selector rod R is pulled completely out and draw bar 13 is moved forward, arm 501 is swung counterclockwise from its Fig. 10 to its Fig. 11 position. This raises cam 509 and raises the reset bar. When the rod R and the draw bar return to retracted position, arm 501 returns to retracted position, and the cam 509 and reset bar are lowered.

Means is provided for retarding the lowering of the reset bar 357 so that the coin rest 429 and finger 443 will remain retracted after the reset bar has been raised long enough to allow all coins that may have accumulated in the upper coin chute assembly to drop out into the money box. Without such delay, jamming may occur, or an unscrupulous buyer might effect operation in such a way as to close the coin rest 429 and finger 443 before all coins are released to the money box, and thus obtain the return of deposited coins in addition to a package of cigarettes. As shown in Figs. 2, 12 and 13, the retarding means includes a lever 515 pivoted at 517 on the lower coin chute assembly 218. Lever 515 at its forward end has a slot 519 receiving a roller 521 on the reset bar, and is biased by a spring 523 to the retracted position shown in Fig. 13. Lever 515 has a roller 525 at its rearward end. An escapement plate 527 is pivoted at 529 on the lower coin chute assembly 218. This plate carries a weight 530 biasing it to rock counterclockwise as viewed in Fig. 13. The lower end of the plate carries a counterweight 531. A member 533 fixed on the inside face of the plate 527 has a flange 535 spaced from and in a plane parallel to the plane of the plate. This flange has a generally V-shaped notch 537. Opposite the notch on the inside of the plate are tongues 539 and 541 arranged in a V-shape corresponding to the shape of the notch 537. This provides a V-shaped passage 545 for the roller 525. The flange 535 has a curved lower edge 547. Pivoted at 549 on the outside of the escapement plate 527 is an arm 551 (see Fig. 12). This has a finger 553 at its lower end extending through a slot 555 in the escapement plate to the inside of the plate. A spring 557 biases the arm to the retracted position at the forward end of the slot illustrated in Figs. 12 and 13. The plate 527 normally occupies the position shown in Figs. 12 and 13 determined by engagement of its forward edge with a stud 559 on the lower coin chute assembly.

When a rod R is pulled out and the reset bar 357 is thereby raised, lever 515 is rocked counterclockwise from its position shown in Fig. 13. As it rocks counterclockwise, the roller 525 at its rearward end moves downward in front of the flange 535, enters and passes through the V-shaped passage 545, causing the plate 527 to rock forward from its Fig. 13 position and then rearward back to its Fig. 13 position. As the roller 525 exits from the passage 545, it engages the top of finger 553, which is angled forward and downward, and swings the arm 551 rearward. When the roller clears the finger, the arm swings back over the roller. When the rod R is returned to its retracted position, the roller 513 is moved down from under the lower end of the reset bar. The bias of spring 523 then swings lever 515 back to its retracted position and the reset bar is returned to its lowered retracted position, but the return is retarded by the passage of the roller 525 back under the finger 553, between the finger and the lower edge 547 of the flange 535, and through the V-shaped passage 545, causing the plate 527 to rock forward, then rearward, again forward and finally again rearward and back to its Fig. 13 position.

At 571 is shown a normally open switch having an operating lever 573 engageable by a roller 575 (coaxial with roller 521) on the outside of the reset bar 357. The lever 573 is formed so that as the reset bar is raised, the switch 571 is momentarily closed, then opened. At 577 is shown a double-throw switch having a common terminal indicated at 579, and terminals 581 and 583. The switch 577 is normally closed between terminals 579 and 581, normally open between terminals 579 and 583. It has an operating lever 585 engageable by the arm 129 on the rear price shaft 125. At 587 is shown a double-throw switch having a common terminal 589 and terminals 591 and 593. This switch is normally closed between terminals 589 and 591, normally open between terminals 589 and 593. It has an operating lever 595 engageable by the arm 131 on the front price shaft 127.

A wiring plug 597 is mounted on the lower coin chute assembly 218 for connection of a power supply cord (see Fig. 12). As diagrammed in Fig. 23, a line 599 leads from the plug to one terminal of the coil 221. A line 601 leads from the other terminal of the coil 221 to one terminal of the overinsertion control switch 461, which is normally closed. A line 603 connects the other terminal of the switch 461 and a line 605 connected to the plug. The motor control switch 289 is a double-throw switch having a common terminal 607, and terminals 609 and 611. The switch 289 is normally closed between terminals 607 and 611, normally open between terminals 607 and 609. Line 605 is connected to the common terminal 607. A line 613 leads from the normally open terminal 609 to one terminal of the motor 275. A line 615 connects the other terminal of the motor and the line 599. A line 617 connects the terminal 611 of switch 289 and one terminal of the solenoid 163. A line 619 connects the other terminal of the solenoid 163 and the main terminal 369 of the selector switch. As herein shown, connections are made for vending items priced at twenty-five cents, thirty cents and thirty-five cents, comprising a line 621 connected between the twenty-five cent terminal T-5 of the selector switch and terminal 581 of the switch 577, a line 623 connected between the thirty cent terminal T-6 of the selector switch and the terminal 583 of the switch 577, and a line 625 connected between the thirty-five cent terminal T-7 of the selector switch and the terminal 593 of the switch 587. A line 627 is connected between terminal 579 of switch 577 and terminal 591 of switch 587. A line 629 is connected between terminal 589 of switch 587 and one terminal of the switch 571. A line 631 is connected between the other terminal of the switch 571 and the line 599.

Operation is as follows:

A nickel deposited in the vending machine is fed to the coin selector 211. Assuming that a power supply cord is connected to plug 597 and that the off-current deflector coil 221 is energized, the nickel will travel completely through the selector and be delivered into the upper end of the nickel chute 205. As the nickel falls in chute 205, it engages the finger 293 on the end of the operating lever 287 for the motor control switch 289, and swings this lever downward to close the motor switch between terminals 607 and 609. This initiates operation of the motor 275 to rotate the coin-driving wheel 265 clockwise as viewed in Figs. 12 and 17 (counterclockwise as viewed in Figs. 18 and 19). The nickel is pinched edgewise between the nickel stop 281 of the coin-driving wheel and the opposite edge of the chute 205 and is driven downward in the chute. As the nickel is driven downward, it engages the finger 307 at the lower end of the nickel arm 301, and swings the arm 301 rearward (to the right as viewed in Fig. 17). The arm 301, in swinging rearward, drives the shift rod 315 rearward against the bias of spring 325 to the point where the nose 329 on the latch member 327 is moved over the finger 293, which is initially held down at the lower end of the arcuate slot 295 by the nickel. The shift rod 315 remains in its moved position as long as the nickel engages the finger 307. Thus, while the nickel moves downward out of engagement with finger 293, the nose 329 on the latch member 327 holds the switch lever 287 down to keep the motor switch 289 closed between terminals 607 and 609 until the nickel travels out of engagement with the finger 307.

The stated rearward movement of the shift rod 315 moves the stud 347 rearward away from the lower end of the rocker arm 335. The spring 343 thereupon rocks the arm 335 and shifts the pinion 337 into mesh with the gear 339. The motor 275 is now in operation (the nickel having operated lever 287 to close the motor control switch 289 between terminals 607 and 609) and the pinion 337 hence is rotating, being driven from the motor shaft 267 by the gear 333 in clockwise direction as viewed in Fig. 13. The gear 339 is accordingly driven counterclockwise as viewed in Fig. 13. When the nickel rides off the finger 307, spring 325 returns the shift rod 315 to its retracted position. This moves the nose 329 on latch member 327 clear of the finger 293 on lever 287, to allow the lever 287 to swing up and open the motor control switch 289 between terminals 607 and 609 to stop the motor. It also results in movement of the stud 347 into engagement with the lower end of the rocker arm 335 to rock the rocker arm counterclockwise as viewed in Fig. 13, thereby to shift the pinion 337 out of mesh with the gear 339. When switch 289 opens between terminals 607 and 609, it closes between terminals 607 and 611.

The length of the curved edge of the finger 307 engaged by the nickel is such that the motor 275 is operated and pinion 337 is held in mesh with gear 339 for such a length of time as to effect rotation of the gear 339 through a fraction of a revolution corresponding to one tooth interval of the ratchet 349 and one interval between the price contacts. The result is that ratchet 349 is stepped forward one tooth and the free end of the contact blade 365 is rotated counterclockwise from the zero position shown in Fig. 13 upward one step and onto the first price contact C-1. The blade 365 is maintained in this position by the action of the holding pawl 351, which clicks in behind a tooth of the ratchet under the bias of spring 355. The pawl keeps the assembly of the gear 339, ratchet 349 and blade 365 from being returned to zero position by the bias of the coil return spring 381. Upon the stated rotation of the gear 339, the stud 375 moves upward away from the finger 377 at the upper end of the stop bar 379. This frees the stop bar for upward movement with the result that the restraint upon the coin gate 393 is removed. The coin gate thereupon swings to its closed position under the bias of the spring 413, pin 415 thereupon raising the stop bar 379.

The nickel riding off the finger 307 and out of the lower end of the chute 205 enters the chute 205b and rolls down this chute to a forward position resting on the finger 431, being kept from rolling out of the chute 205b by the finger 399 (see Fig. 17). Additional nickels inserted in the vending machine act to step the ratchet one tooth interval in the same manner as above described, and eventually are received in the chute 205b one behind the other in edge-to-edge relation. Each nickel, in effecting stepping of the ratchet one tooth interval, effects stepping of the free end of the blade 365 from whatever price contact it was on to the next higher price contact. Thus, the second nickel deposited will effect movement of the free end of the blade from contact C-1 to C-2, a third nickel from contact C-2 to C-3, a fourth nickel from contact C-3 to C-4 and so on. The chute 205b, as herein illustrated, is adapted to hold up to five nickels. When it is full, any additional nickels inserted in the machine and exiting from the lower end of chute 205 will enter the chute 205a. The first nickel entering the chute 205a rolls down this chute to a position of rest on the finger 395, being kept from rolling out of the forward end of the chute 205a by the finger 443. Additional nickels accumulate behind the first nickel in chute 205a.

A dime or a quarter deposited in the vending machine is fed to the coin selector 211. Again assuming that the off-current deflector coil 221 is energized, the dime will travel completely through the selector and be delivered into the upper end of the dime chute 207. The quarter will travel completely through the selector and be delivered into the upper end of the quarter chute 209. The dime or the quarter, falling in the respective chute 207 or 209, engages the finger 293 in the same manner as a nickel, and initiates operation of the motor 275 to rotate the coin-driving wheel 265. A dime is pinched edgewise between the dime step 283 of the wheel and the opposite edge of the chute 207 and is driven downward in the chute 207. Similarly, a quarter is pinched edgewise between the quarter step 285 of the wheel and the opposite edge of the chute 209, and is driven downward in the chute 209. As a dime is driven downward, it engages the finger 309 at the lower end of the dime arm 303, and swings the arm 303 rearward. As a quarter is driven downward, it engages the finger 311 at the lower end of the quarter arm 305, and swings the arm 305 rearward.

Rearward movement of arm 303 by a dime or rearward movement of arm 305 by a quarter drives the shift rod 315 rearward. This results in latching down of the motor switch control lever 287 and meshing of the pinion 337 with the gear 339 in the same manner as occurs upon deposit of a nickel, as previously described. A dime holds the shift rod 315 rearward and thus holds the motor 275 in operation and the pinion 337 in mesh with the gear 339 for the length of time during which the dime rides on the finger 309. This is twice as long as in the case of a nickel, and the gear 339 is thereby rotated through a fraction of a revolution corresponding to two tooth intervals of the ratchet and two price contact intervals. The result is that the ratchet is stepped forward two teeth and the free end of the contact blade 365 is rotated counterclockwise two price contact intervals. A quarter holds the shift rod 315 rearward and thus holds the motor 275 in operation and the pinion 337 in mesh with the gear 339 for the length of time during which the quarter rides on the finger 311. This is five times as long as in the case of a nickel, and the gear 339 is thereby rotated through a fraction of a revolution corresponding to five tooth intervals of the ratchet and five price contact intervals. The result is that the ratchet is stepped forward five teeth and the free end of the contact blade 365 is rotated counterclockwise five price contact intervals.

It will be understood that if a dime is the first coin deposited, the free end of the blade 365 will be rotated counterclockwise from the zero position shown in Fig. 13 upward two steps and onto the second price contact C-2. If a quarter is the first coin deposited, the free end of the contact blade 365 is rotated counterclockwise from the zero position shown in Fig. 13 upward five steps and onto the fifth price contact C-5. If a nickel is inserted first and then a dime (a total of fifteen cents), insertion of the nickel will step the free end of the contact blade from the zero position to contact C-1 and the subsequent insertion of the dime will step the free end of the blade up to contact C-3 (the fifteen cent price contact). If, for example, a quarter is inserted first, and then a dime (a total of thirty-five cents), insertion of the quarter will step the free end of the contact blade from the zero position to the contact C-5 (the twenty-five cent contact) and the subsequent insertion of the dime will further step the free end of the blade to contact C-7 (the thirty-five cent contact). The operation for other combinations of coins, and other orders of deposit of the coins, will be apparent. In the case of any combination of coins, the ratchet is held by the holding pawl 351 to hold the free end of the blade 365 in contact with that one of the price contacts which corresponds to the total amount or value of coins which have been deposited.

It will be understood that deposit of a dime or quarter, with resultant rotation of the gear 339, will result in closing of the coin gate 393 in the same manner as occurs upon deposit of a nickel. A dime riding off the finger 309 and out of the lower end of the chute 207 enters the chute 253 and rolls down this chute into the chute 255, coming to rest on the finger 431, and being kept from rolling out of the chute 255 through the outlet O-5 by the finger 399 of the closed coin gate 393. Similarly, a quarter riding off the finger 311 and out of the lower end of the chute 209 enters the chute 253 and rolls down this chute into the chute 255, coming to rest on the finger 431, and being kept from rolling out of the chute 255 through the outlet O-5 by the finger 399 of the closed coin gate 393. The chute 255 is wide enough to accommodate a number of coins side-by-side resting on the finger 431.

Assuming that the buyer has inserted twenty-five cents in coin, the contact blade 365 will be in engagement with the twenty-five cent price contact C-5, as shown in solid lines in Fig. 23. Now, when the buyer pulls out a selector rod R for obtaining a twenty-five cent item, the reset bar 357 is raised high enough before the shoulder 105 on the lever 59 engages the stop 107 to close the switch 571. When switch 571 closes, a circuit is completed through the solenoid 163 as follows: from line 599 through line 631, switch 571 (closed by the reset bar), line 629, from terminal 589 to terminal 591 of switch 587 (normally closed between these terminals), line 627, from terminal 579 to terminal 581 of switch 577 (normally closed between these terminals), line 621, the twenty-five cents terminal T-5 and contact C-5, blade 365, wiper 371, main terminal 369 of the selector switch, line 619, solenoid 163, line 617, and from terminal 611 to 607 of switch 289 and line 605. This retracts the stop 107, thereby permitting the selector rod R to be completely pulled out.

As the pulling out of the rod R is completed, the reset bar 357 is raised to a point where the switch 571 opens, and finally to a point where cam plate 363 on the reset bar engages the pawl 351 to release it. This results in the return of the gear 339, ratchet 349 and contact blade 365 to the zero position under the return bias of the return spring 381. Switch 571 is opened before the pawl 351 is released to open the circuit before blade 365 returns to zero position, thereby avoiding arcing between the blade and the selector switch contacts. Raising of the reset bar also results in the raising of the spring finger 439 out of contact with the cam 441 on the coin rest 429 to allow the coin rest to swing away from the upper coin chute assembly 203 under the bias of spring 437, with the result that finger 431 is withdrawn from the slot 433. Accordingly, any nickels in chute 205b, dimes in chute 255 or a quarter in chute 255 are released to fall into the coin box 247. Also, as the reset bar is raised, cam 421 becomes operative to hold up the stop bar 379. This holds the coin gate 393 from swinging out until the reset bar 357 returns to its lower retracted position. As the reset bar is raised, finger 443 is raised, and any nickels in chute 205a will roll out into the chute 473 and drop into the coin box. Here it will be apparent that the coin gate 393 must be held closed while the reset bar is being raised, to prevent any nickels in chute 205a and any nickels in chute 205b and any dimes or a quarter in chute 255 from rolling out into chute 217 and returning to the buyer.

Upon return of the selector rod R to its retracted position, a twenty-five cent item is dispensed as previously described. Upon the return of the selector rod to its retracted position, the cam 509 is returned to its retracted position shown in Fig. 10, thereby lowering roller 513 from under the lower end of the reset bar 357. The reset bar then moves downward to its retracted position, its downward movement being retarded by the retarding mechanism comprising the lever 515 and the escapement plate 527, and parts controlled by the reset bar return to their initial position. The retard is long enough to allow for the greatest number of coins that may accumulate in the upper coin chute assembly to drop out and into the coin box before coin rest 429 and finger 443 assume their coin-blocking position.

If a buyer, having inserted twenty-five cents in coin, attempts to pull out the thirty cent rod or the thirty-five cent rod, the solenoid circuit is prevented from being closed, and the thirty cent or thirty-five cent rod, as the case may be, is locked out of operation. If the thirty cent rod is pulled out, switch 577 is opened between terminals 579 and 581, closed between 579 and 583, and the solenoid circuit is then open at terminal T-6. If the thirty-five cent rod is pulled out, switch 587 is opened between terminals 589 and 591, closed between 589 and 593, and the solenoid circuit is then open at terminal T-7.

Assuming that the buyer has inserted thirty cents in coin, the contact blade 365 will be engagement with the thirty cent price contact C-6, as shown in dotted lines in Fig. 23. Now, when the customer pulls out the thirty cent selector rod R, switch 577 is opened between terminals 579 and 581 and closed betwen 579 and 583, and when switch 571 is closed by the raising of the reset bar, a circuit is completed through the solenoid 163 as follows: from line 599 through line 631, switch 571 (now closed), through line 629, switch 587 (closed between contacts 589 and 591), line 627, from contact 579 to 583 of switch 577, and line 623 to contact C-6, thence through blade 365, wiper 371, terminal 369, line 619, solenoid 163, line 617, and switch 289 to line 605. This retracts the stop 107, permitting the thirty cent rod R to be completely pulled out. If thirty cents has been inserted, and an effort is made to obtain a twenty-five cent item, the switch 577 will remain closed across contacts 579 and 581, and open between 579 and 583. Accordingly, the solenoid circuit will not be completed. Thus overpayment is prevented, and the buyer may obtain return of his money by operating the coin return bar 445. If an effort should be made to obtain a thirty-five cent item the switch 587 will be opened between terminals 589 and 591, closed between terminals 589 and 593 and the solenoid circuit will be open at T-7.

Assuming that the buyer has inserted thirty-five cents in coin, the blade 365 of the selector switch will be in engagement with the thirty-five cent price contact C-7, as shown in dotted lines in Fig. 23. Now, when the thirty-five cent rod R is pulled out, switch 587 is opened between terminals 589 and 591, closed between 589 and 593, and when switch 571 is closed by the raising of the reset bar, a circuit for the solenoid 163 is completed as follows: from line 599 through line 631, switch 571 (now closed), line 629, from contact 589 to 593 of switch 587, through line 625 to contact C-7, through blade 365, wiper 371, terminal 369, line 619, solenoid 163, line 617, and switch 289 to line 605. This results in release of the stop 107 so that the thirty-five cent selector rod may be completely pulled out. If, after deposit of thirty-five cents, a twenty-five cent or thirty cent rod is pulled, the stop will not be released. If either a twenty-five cent or a thirty cent rod is pulled, the switch 587 will remain open between terminals 589 and 593 and the solenoid circuit hence is open. Thus, over-payment is prevented in the case of the deposit of thirty-five cents.

It will be apparent that the apparatus may be easily converted to different three-price set ups simply by changing the connections of the wires 621, 623 and 625 to the terminals of the selector switch. For example, for conversion to a twenty cent, twenty-five cent and thirty cent set up, the wires 621, 623 and 625 would be connected to terminals T-4, T-5 and T-6, respectively, instead of to terminals T-5, T-6 and T-7 as shown for the twenty-five cent, thirty cent and thirty-five cent set up.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. In a vending machine, a first, a second and a third selector operable to obtain items of a first, a second and a third price, respectively, electrically actuated means for locking said selectors against complete operation to obtain any item but permitting limited operation of the selectors, and a control circuit for said electrically actuated means comprising a first, a second and a third switch and a selector switch, said selector switch having contacts corresponding to said first, second and third prices, said circuit being completed upon setting of said selector switch on the first price contact and operation of said first switch, said circuit also being completed upon setting of said selector switch on the second price contact and operation of said first and second switches, and said circuit also being completed upon setting of said selector switch on the third price contact and operation of said first and third switches, means for operating said first switch in response to limited operation of any one of the selectors, means for operating the second switch in response to limited operation of the second selector, means for operating the third switch in response to limited operation of the third selector, and means operable in response to insertion of coins in said vending machine for setting said selector switch on the respective price contacts in response to insertion of coins in the respective amounts.

2. In a vending machine, a first, a second and a third selector operable to obtain items of a first, a second and a third price, respectively, electrically actuated means for locking all three selectors against complete operation to obtain any item but permitting limited operation of the selectors, and a control circuit for said electrically actuated means comprising a normally open switch, a first and a second double-throw switch and a selector switch, each of said double-throw switches being normally closed on one contact thereof and closing on another contact thereof when operated, said selector switch having contacts corresponding to said first, second and third prices, said switches being interconnected so that said circuit is completed upon setting of said selector switch on the first price contact and closure of said normally open switch, said circuit also being completed upon setting of said selector switch on the second price contact, operation of said first double-throw switch and closure of said normally open switch, and said circuit also being completed upon setting of said selector switch on the third price contact, operation of said second double-throw switch and closure of said normally open switch, means for closing said normally open switch in response to limited operation of any of the selectors, means for operating the first double-throw switch in response to limited operation of the second selector, means for operating the second double-throw switch in response to limited operation of the third selector, and means operable in response to insertion of coins in said vending machine for setting said selector switch on the respective price contacts in response to insertion of coins in the respective amounts.

3. In a vending machine, a first, a second and a third selector operable to obtain items of a first, a second and a third price, respectively, each selector requiring full-stroke operation for obtaining an item of the respective class, a stop movable from an operative position in which it allows only a limited operation of said selectors to a retracted position allowing full-stroke operation, electrically actuated means for moving the stop, and a control circuit for said electrically actuated means comprising a first, a second and a third switch and a selector switch, said selector switch having contacts corresponding to said first, second and third prices, said circuit being completed upon setting of said selector switch on the first price contact and operation of said first switch, said circuit also being completed upon setting of said selector switch on the second price contact and operation of said first and second switches, and said circuit also being completed upon setting of said selector switch on the third price contact and operation of said first and third switches, means for operating said first switch in response to said limited operation of any one of the selectors, means for operating the second switch in response to said limited operation of the second selector, means for operating the third switch in response to said limited operation of the third selector, and means operable in response to insertion of coins in said vending machine for setting said selector switch on the respective price contacts in response to insertion of coins in the respective amounts.

4. In a vending machine, a first, a second and a third selector operable to obtain items of a first, a second and a third price, respectively, each selector requiring full-stroke operation for obtaining an item of the respective class, a stop movable from an operative position in which it allows only a limited operation of said selectors to a retracted position allowing full-stroke operation, electrically actuated means for moving the stop, and a control circuit for said electrically actuated means comprising a normally open switch, a first and a second double-throw switch and a selector switch, each of said double-throw switches being normally closed on one contact thereof and closing on another contact thereof when operated, said selector switch having contacts corresponding to said first, second and third prices, said switches being interconnected so that said circuit is completed upon setting of said selector switch on the first price contact and closure of said normally open switch, said circuit also being completed upon setting of said selector switch on the second price contact, operation of said first double-throw switch and closure of said normally open switch, and said circuit also being completed upon setting of said selector switch on the third price contact, operation of said second double-throw switch and closure of said normally open switch, means for closing said normally open switch in response to said limited operation of any of the selectors, means for operating the first double-throw switch in response to said limited operation of the second selector, means for operating the second double-throw switch in response to said limited operation of the third selector, and means operable in response to insertion of coins in said vending machine for setting said selector switch on the respective price contacts in response to insertion of coins in the respective amounts.

5. In a vending machine having at least three manually operable mechanical dispensers for items of a first, a second and a third price, respectively, each dispenser including a pull-out rod adapted to be pulled out from a retracted position and then returned to retracted position for dispensing an item, means for holding all the rods against operation to dispense any item including a stop movable between an operative position and a retracted position, said stop, in its operative position, allowing a limited movement of any rod insufficient for dispensing an item, electrically actuated means for moving the stop, and a control circuit for said electrically actuated means comprising a first, a second and a third switch and a selector switch, said selector switch having contacts corresponding to said first, second and third prices, said circuit being completed upon setting of said selector switch on the first price contact and operation of said first switch, said circuit also being completed upon setting of said selector switch on the second price contact and operation of said first and second switches, and said circuit also being completed upon setting of said selector switch on the third price contact and operation of said first and third switches, means for operating said first switch in response to said limited movement of any one of the rods, means for operating the second switch in response to said limited movement of the rod for the dispenser for items of the second price, means for operating the third switch in response to said limited movement of the rod for the dispenser for items of the third price, and means operable in response to insertion of coins in said vending machine for setting said selector switch on the respective price contacts in response to insertion of coins in the respective amounts.

6. In a vending machine having at least three manually operable mechanical dispensers for items of a first, a second and a third price, respectively, each dispenser including a pull-out rod adapted to be pulled out from a retracted position and then returned to retracted position for dispensing an item, means for holding all the rods against operation to dispense any item including a stop movable between an operative position and a retracted position, said stop, in its operative position, allowing a limited movement of any rod insufficient for dispensing an item, electrically actuated means for moving the stop, and a control circuit for said electrically actuated means comprising a normally open switch, a first and a second double-throw switch and a selector switch, each of said double-throw switches being normally closed on one contact thereof and closing on another contact thereof when operated, said selector switch having contacts corresponding to said first, second and third prices, said switches being interconnected so that said circuit is completed upon setting of said selector switch on the first price contact and closure of said normally open switch, said circuit also being completed upon setting of said selector switch on the second price contact, operation of said first double-throw switch and closure of said normally open switch, and said circuit also being completed upon setting of said selector switch on the third price contact, operation of said second double-throw switch and closure of said normally open switch, means for closing said normally open switch in response to said limited movement of any of the rods, means for operating the first double-throw switch in response to said limited movement of the rod for the dispenser for items of the second price, means for operating the second double-throw switch in response to said limited movement of the rod for the dispenser for items of the third price, and means operable in response to insertion of coins in said vending machine for setting said selector switch on the respective price contacts in response to insertion of coins in the respective amounts.

7. In a vending machine having a plurality of manually operable mechanical dispensers for items of a first, a second and a third price, each dispenser including a pull-out rod adapted to be pulled out from a retracted position and then returned to retracted position for dispensing an item, means for holding all the rods against operation to dispense any item including a stop movable between an operative position and a retracted position, said stop, in its operative position, allowing a limited movement of any rod insufficient for dispensing an item, electrically actuated means for moving the stop, and a control circuit for said electrically actuated means comprising a first, a second and a third switch and a selector switch, said selector switch having contacts corresponding to said first, second and third prices, said circuit being completed upon setting of said selector switch on the first price contact and operation of said first switch, said circuit also being completed upon setting of said selector switch on the second price contact and operation of said first and second switches, and said circuit also being completed upon setting of said selector switch on the third price contact and operation of said first and third switches, means for operating said first switch in response to said limited movement of any one of the rods, a first rock shaft operable by the rod for a dispenser for items of the second price upon said limited movement of said rod, means on said first rock shaft for operating the second switch, a second rock shaft operable by the rod for a dispenser for items of the third price upon said limited movement of said rod, means on said second rock shaft for operating the third switch, and means operable in response to insertion of coins in said vending machine for setting said selector switch on the respective price contacts in response to insertion of coins in the respective amounts.

8. In a vending machine having a plurality of manually operable mechanical dispensers for items of a first, a second and a third price, each dispenser including a pull-out rod adapted to be pulled out from a retracted position and then returned to retracted position for dispensing an item, means for holding all the rods against operation to dispense any item including a stop movable between an operative position and a retracted position, said stop, in its operative position, allowing a limited movement of any rod insufficient for dispensing an item, electrically actuated means for moving the stop, and a control circuit for said electrically actuated means comprising a normally open switch, a first and a second double-throw switch and a selector switch, each of said double-throw switches being normally closed on one contact thereof and closing on another contact thereof when operated, said selector switch having contacts corresponding to said first, second and third prices, said switches being interconnected so that said circuit is completed upon setting of said selector switch on the first price contact and closure of said normally open switch, said circuit also being completed upon setting of said selector switch on the second price contact, operation of said first double-throw switch and closure of said normally open switch, and said circuit also being completed upon setting of said selector switch on the third price contact, operation of said second double-throw switch and closure of said normally open switch, means for closing said normally open switch in response to said limited movement of any of the rods, a first rock shaft operable by the rod for a dispenser for items of the second price upon said limited movement of said rod, means on said first rock shaft for operating the first double-throw switch, a second rock shaft operable by the rod for a dispenser for items of the third price upon said limited movement of said rod, means on said second rock shaft for operating the second double-throw switch, and means operable in response to insertion of coins in said vending machine for setting said selector switch on the respective price contacts in response to insertion of coins in the respective amounts.

9. In a vending machine, a dispensing unit comprising at least three manually operable mechanical dispensers for items of a first, a second and a third price, respectively, each dispenser including a selector, means mounted on the dispensing unit for locking said selectors against operation to obtain any item, a coin unit removably mounted on the dispensing unit, said coin unit carrying electrically actuated means for operating said locking means, and a control circuit for said electrically actuated means comprising a first, a second and a third switch and a selector switch carried by said coin unit, said selector switch having contacts corresponding to said first, second and third prices, said circuit being completed upon setting of said selector switch on the first price contact and operation of said first switch, said circuit also being completed upon setting of said selector switch on the second price contact, and operation of the first and second switches, and said circuit also being completed upon setting of said selector switch on the third price contact and operation of the first and third switches, means for operating said first switch in response to operation of any one of the selectors, means mounted on the dispensing unit for operating the second and third switches in response to operation of the selectors for the dispensers for items of the second and third price, respectively, and means operable in response to insertion of coins in said vending machine for setting said selector switch on the respective price contacts in response to insertion of coins in the respective amounts.

10. In a vending machine as set forth in claim 9, said coin unit having a money box, coin return means, means for holding coins therein from passing to the money box, a reset bar movable from a retracted position for resetting the selector switch and opening said holding means, means operable by any one of the selectors for moving the reset bar from its retracted position, said bar being adapted to return to retracted position after each operation of any selector, and means for delaying the return of the bar to retracted position.

References Cited in the file of this patent

UNITED STATES PATENTS 2,604,966     Smith _____ July 29, 1952

FOREIGN PATENTS 911,341     Germany _____ May 13, 1954